(12) United States Patent
Chen et al.

(10) Patent No.: US 11,036,962 B2
(45) Date of Patent: Jun. 15, 2021

(54) FINGERPRINT ENROLLMENT METHOD, ELECTRONIC APPARATUS AND COMPUTER-READABLE STORAGE MEDIUM THEREOF

(71) Applicant: HTC Corporation, Taoyuan (TW)

(72) Inventors: Ping-Hsun Chen, Taoyuan (TW); Shih-Ying Fu, Taoyuan (TW); Wei-Jhen Huang, Taoyuan (TW); Hsiang-Ning Wu, Taoyuan (TW); Sheng-Hsin Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 663 days.

(21) Appl. No.: 15/272,426

(22) Filed: Sep. 21, 2016

(65) Prior Publication Data
US 2017/0091523 A1    Mar. 30, 2017

Related U.S. Application Data

(60) Provisional application No. 62/234,684, filed on Sep. 30, 2015.

(51) Int. Cl.
*G06K 9/00* (2006.01)
*G06F 21/32* (2013.01)
(Continued)

(52) U.S. Cl.
CPC ......... *G06K 9/00087* (2013.01); *G06F 21/32* (2013.01); *G06K 9/00013* (2013.01);
(Continued)

(58) Field of Classification Search
CPC ........... G06K 9/00006; G06K 9/00087; G06K 9/00926; G06K 9/00026; G06K 9/4652;
(Continued)

(56) References Cited

U.S. PATENT DOCUMENTS

| 5,852,670 A * | 12/1998 | Setlak | G06K 9/0002 |
| | | | 382/126 |
| 7,614,010 B2 * | 11/2009 | Hosoki | G06F 9/485 |
| | | | 715/767 |

(Continued)

FOREIGN PATENT DOCUMENTS

| TW | 201525750 | 7/2015 |
| TW | 201525878 | 7/2015 |

OTHER PUBLICATIONS

"Search Report of European Counterpart Application," dated Feb. 22, 2017, p. 1-p. 8, in which the listed reference was cited.

(Continued)

*Primary Examiner* — Seth A Silverman
(74) *Attorney, Agent, or Firm* — JCIPRNET

(57) ABSTRACT

A fingerprint enrollment method, an electronic apparatus, a computer-readable storage medium are provided. The method includes following steps. An indication icon is displayed, wherein the indication icon is divided into N regions, N is a positive integer larger than 1, a region of the N regions is initially painted with a first color, and other regions of the N regions are initially painted with a second color. Whether a sensor apparatus is being touched is determined. When determined that the sensor apparatus is being touched, whether to capture a fingerprint image is determined. Each time when the fingerprint image is captured, the region with the first color is painted to a third color, and one of the N regions with the second color is painted to the first color. When number of the captured fingerprint image is up to N, a fingerprint sample is obtained from the captured fingerprint images.

18 Claims, 9 Drawing Sheets

(51) Int. Cl.
    *G06K 9/46*         (2006.01)
    *G06F 3/0481*     (2013.01)
    *G06F 3/0488*     (2013.01)

(52) U.S. Cl.
    CPC ..... *G06K 9/00026* (2013.01); *G06K 9/00912* (2013.01); *G06K 9/00926* (2013.01); *G06K 9/4652* (2013.01); *G06F 3/0488* (2013.01); *G06F 3/04817* (2013.01); *G06K 2009/4666* (2013.01)

(58) Field of Classification Search
    CPC ............ G06K 2009/4666; G06F 21/32; G06F 3/04817
    See application file for complete search history.

(56) References Cited

U.S. PATENT DOCUMENTS

| | | |
|---|---|---|
| 2015/0074615 A1 | 3/2015 | Han et al. |
| 2015/0146945 A1* | 5/2015 | Han ................... G06K 9/00033 382/125 |
| 2015/0235098 A1 | 8/2015 | Lee et al. |

OTHER PUBLICATIONS

"Office Action of Taiwan Counterpart Application," dated May 22, 2017, p. 1-p. 9, in which the listed references were cited.

\* cited by examiner

FINGERPRINT ENROLLMENT METHOD, ELECTRONIC APPARATUS AND COMPUTER-READABLE STORAGE MEDIUM THEREOF

CROSS-REFERENCE TO RELATED APPLICATION

This application claims the priority benefit of U.S. provisional application Ser. No. 62/234,684, filed on Sep. 30, 2015. The entirety of the above-mentioned patent application is hereby incorporated by reference herein and made a part of this specification.

BACKGROUND OF THE INVENTION

Field of the Invention

The invention relates to an enrollment method, an electronic apparatus and a computer-readable storage medium thereof, and particularly relates to a fingerprint enrollment method, an electronic apparatus and a computer-readable storage medium thereof.

Description of Related Art

Along with development of electronic technology, smart devices, such as smart phones and tablet computers, have become more popular in recent years. With various applications installed inside, smart devices may be used for data processing, personal organizing, entertainment, and communication. Since smart devices are such convenient tools, it is hard to imagine a life without those devices nowadays.

Due to the confidential nature of information and applications stored in smart devices, security features is required to prevent unauthorized access to steal important information such as personal identification number and password of owner's bank account or to run applications with crucial or confidential data such as eWallet and e-mail. Several authentication mechanisms are proposed and used in smart devices for security purpose.

Fingerprint authentication is one of the most well-known biometrics, and it is by far the most used biometric solution for authentication on smart devices. To be more specific, finger authentication refers to the method of verifying a match between the inputted fingerprint and the fingerprint sample pre-stored in a database. As such, it relies on the database containing scan samples of fingerprints for correctly determining whether the person providing the fingerprint is allowed to access the smart device or not.

For the smart device applying the fingerprint authentication, a fingerprint sensor is necessary. User of the smart device may first enroll the fingerprint into the database through the fingerprint sensor, and activates or unlocking the smart device by touching the fingerprint sensor with his finger on following usage of the smart device. However, due to the limited space of the smart device, the fingerprint sensor is usually small and not capable of capturing the whole fingerprint in once. Therefore, how to correctly and effectively guiding a fingerprint enrollment through a limited fingerprint sensor is still a goal of effort for those technicians of the field.

SUMMARY OF THE INVENTION

The invention is directed to a fingerprint enrollment method, an electronic apparatus and a computer-readable storage medium thereof, by which the fingerprint enrollment could be correctly and effectively guided.

An embodiment of the invention provides a fingerprint enrollment method. The fingerprint enrollment method adapted to an electronic apparatus having a sensor apparatus includes following steps. An indication icon is displayed. The indication icon is divided into N regions, N is a positive integer larger than 1, a region of the N regions is initially painted with a first color, and other regions of the N regions are initially painted with a second color. Whether the sensor apparatus is being touched is determined. When determined that the sensor apparatus is being touched, whether to capture a fingerprint image is determined. Each time when the fingerprint image is captured, the region with the first color is painted to a third color, and one of the N regions with the second color is painted to the first color. When number of the captured fingerprint images is up to N, a fingerprint sample is obtained from the captured fingerprint images.

In one embodiment of the present invention, the indication icon is a graphical fingerprint icon. When determined that the sensor apparatus is being touched, capturing the fingerprint image includes following steps. Whether number of sensors being covered in the sensor apparatus being touched is over a coverage threshold is determined. In response to a determination that the number of the sensors being covered is over the coverage threshold, a current image is captured.

In one embodiment of the present invention, when determined that the sensor apparatus is being touched, capturing the fingerprint image further includes following steps. Whether a percentage value of a fingerprint part occupied in the current image is over an image threshold is determined. In response to a determination that the percentage value of the fingerprint part occupied in the current image is over the image threshold, the current image is determined as the fingerprint image.

In one embodiment of the present invention, a first region of the N regions in the indication icon is initially painted with the first color, and painting the region with the first color to the third color and painting the one of the n regions with the second color to the first color include following steps. The region with the first color is painted to the third color. A painting order is followed to sequentially paint the one of the N regions with the second color to the first color, wherein the painting order is from a second region of the N regions to a $N_{th}$ region of the N regions.

In one embodiment of the present invention, the first region to a $M_{th}$ region of the N regions are located at a central part of the indication icon, and a $(M+1)_{th}$ region to the $N_{th}$ region of the N regions are located at an outer part of the indication icon, N is a positive integer larger than 3, M is a positive integer lower than N but larger than 1.

In one embodiment of the present invention, obtaining the fingerprint sample further includes following steps. The fingerprint images are combined to obtain the fingerprint sample. The fingerprint sample is added into an authentication model.

In one embodiment of the present invention, obtaining the fingerprint sample further includes following step. The fingerprint sample is linked to an execution of an application.

In one embodiment of the present invention, displaying the indication icon further includes following step. A first content string is displayed with the indication icon. Moreover, the fingerprint enrollment method further includes following step. When a $L_{th}$ region of the N regions is painted to the first color, a second content string is displayed instead of the first content string with the indication icon, where L is a positive integer larger than 1 but lower than (N+1).

In one embodiment of the present invention, after the fingerprint sample is obtained, when the sensor apparatus is being touched over a time threshold for unlocking the electronic apparatus, an input image is captured and verified by the fingerprint sample.

In one embodiment of the present invention, when the input image is verified to be valid for unlocking the electronic apparatus, the fingerprint sample is further updated according to the input image.

Another embodiment of the invention provides an electronic apparatus. The electronic apparatus includes a sensor apparatus, a display unit and a processing unit. The sensor apparatus includes a plurality of sensors arranged in a sensor matrix. The display unit displays an indication icon, wherein the indication icon is divided into N regions, N is a positive integer larger than 1, a region of the N regions is initially painted with a first color, and other regions of the N regions are initially painted with a second color. The processing unit coupled to the sensor apparatus and the display unit controls the sensor apparatus to determine whether the sensor apparatus is being touched. When determined that the sensor apparatus is being touched, the processing unit controls the sensor apparatus for determining whether to capture a fingerprint image. Each time when the fingerprint image is captured, the processing unit paints the region displayed by the display unit with the first color to a third color, and paints one of the N regions displayed by the display unit with the second color to the first color. When number of the captured fingerprint images is up to N, the processing unit obtains a fingerprint sample from the captured fingerprint images.

An embodiment of the invention provides non-transitory computer-readable storage medium, which stores programs to be loaded into an electronic apparatus having a sensor apparatus to perform steps of the aforementioned method. The computer program is composed of a plurality of program instructions (for example, an organization chart, establishing program instruction, a table approving program instruction, a setting program instruction, and a deployment program instruction, etc.), and these program instructions are loaded into the electronic apparatus and executed by the same to accomplish various steps of the method for fingerprint enrollment.

According to the above description, in the fingerprint enrollment method, the electronic apparatus and the computer-readable storage medium, the indication icon is displayed, and the indication icon is divided into a plurality of regions. Each time the fingerprint image is captured, the region with the first color is painted to the third color, and one of the regions with the second color is painted to the first color. When number of the captured fingerprint images is up to number of the divided regions, the fingerprint sample is further obtained from the captured fingerprint images. Therefore, the fingerprint enrollment is guided by the indication icon displayed by the display unit, such that the fingerprint sample is correctly and effectively obtained.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Within embodiments of the present invention, a fingerprint enrollment method and an electronic apparatus thereof are proposed. To obtain a fingerprint sample from a user, a sensor apparatus is utilized for capturing fingerprint image from the user's finger. However, the size of the sensor apparatus may be limited, especially in the shape of rectangle where length is bigger and width is smaller, such that it is unable to capture the whole fingerprint in once. Therefore, multiple fingerprint images are required, and those images are combined for the fingerprint sample. This is to pursue the optimization balancing having security (industrial standard) and convenience (fewer steps) for users. In the proposed fingerprint enrollment method and the electronic apparatus thereof, an indication icon is applied for guiding the fingerprint enrollment. Through the color variation on the indication icon, the user can notice the progress of the enrollment. Further, in an embodiment of the present invention, through the color variation on the indication icon, the user can further notice the part of the fingerprint that the electronic apparatus is desired to obtain from the user's finger.

Figure 1:
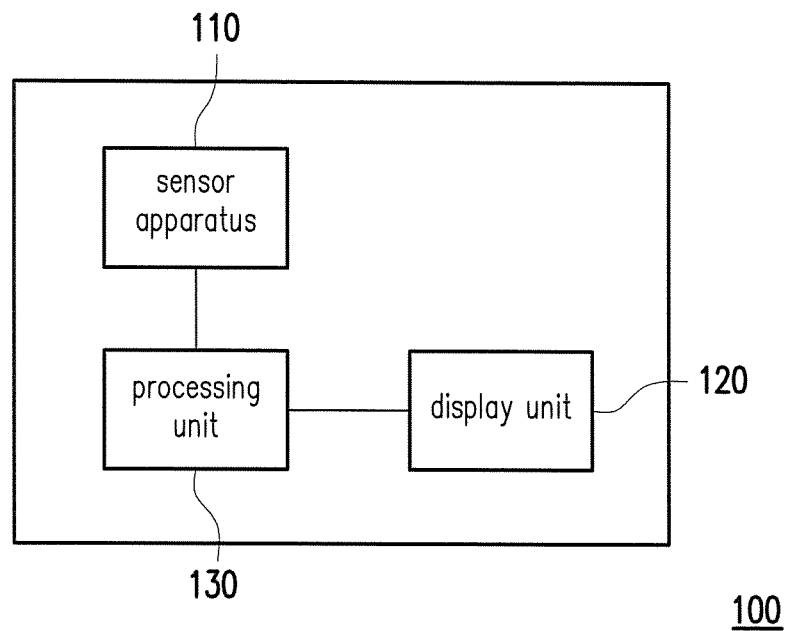
FIG. 1 is a block diagram illustrating an electronic apparatus according to an embodiment of the present invention.
Figure 2:
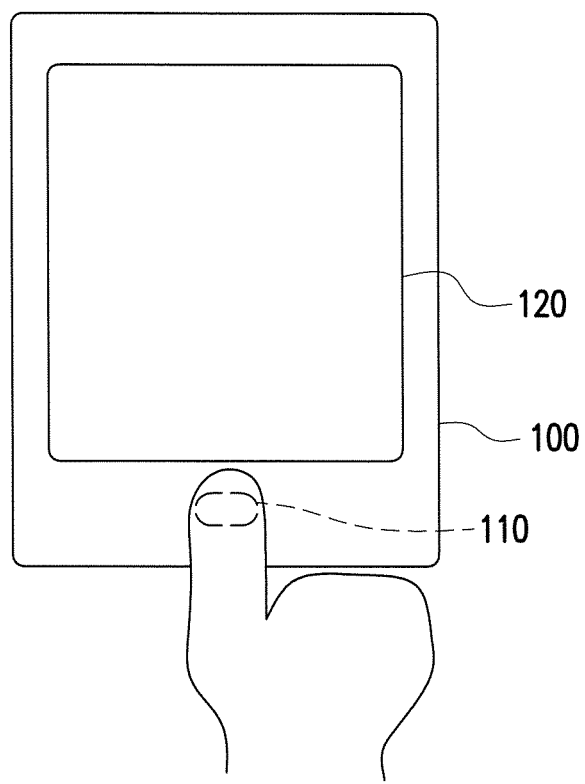
FIG. 2 is a schematic diagram illustrating an electronic apparatus according to an embodiment of the present invention.

FIG. 1 is a block diagram illustrating an electronic apparatus according to an embodiment of the present invention. FIG. 2 is a schematic diagram illustrating an electronic apparatus according to an embodiment of the present invention. Referring to FIG. 1 and FIG. 2, in the present embodiment of the invention, the fingerprint enrollment method is implemented by the electronic apparatus 100, but the invention is not limited to the current embodiment. To be more specific, in the present embodiment, the electronic apparatus 100 is, for example, a laptop computer, a tabular computer or a smart device, but the invention is not limited herein. The electronic apparatus 100 at least includes a sensor apparatus 110, a display unit 120 and a processing unit 130.

In the present embodiment, the sensor apparatus 110 is a fingerprint sensor apparatus. The sensor apparatus 110 includes a plurality of sensors, and those sensors are arranged in a sensor matrix. For example, the sensor matrix may be a 3×4 sensor matrix or a 4×3 sensor matrix which both include 12 sensors, but it is not limited thereto. Specifically, the sensor disposed in the sensor apparatus 110 may be an optical sensor, a capacitive sensor, an ultrasound sensor or a thermal sensor for sensing and capturing the fingerprint image, for example, but not limited thereto.

Moreover, in an embodiment, the sensor apparatus 10 may be implemented with a pressable button or as a touch type button without protruding from the surface of the electronic apparatus 100.

In the present embodiment, the display unit 120 for displaying images may be built in the electronic apparatus 100 or separated from the electronic apparatus 100. Moreover, the display unit 120 is a liquid crystal (LC) display unit, a light-emitting diode (LED) display unit or an organic LED (OLED) display unit, for example, but not limited thereto.

In the present embodiment, the processing unit 130 coupled to the sensor apparatus 110 and the display unit 120 is a central processing unit (CPU), a programmable microprocessor, a digital signal processor (DSP), a graphics processing unit (GPU), a programmable controller, an application specific integrated circuit (ASIC) or a programmable logic device (PLD), for example, but not limited thereto.

In one embodiment of the present embodiment, the electronic apparatus 100 further includes a communication unit (not illustrated) and a storage unit (not illustrated) coupled to the processing unit 130. The communication unit supports various wireless communication standards such as Bluetooth protocol, Wireless Fidelity (Wi-Fi) protocol, LTE (Long Term Evolution) protocol, NFC (Near Field Communication) protocol and so on. In another embodiment of the present invention, the communication unit further supports the wire communication standards such as Asymmetric Digital Subscriber Line (ADSL) communication standard. The storage unit for storing data is a hard disk drive (HDD) of any type, a random access memory (RAM), a read-only memory (ROM), a flash memory, or a combination of the foregoing, for example, but not limited thereto.

In the present invention, the fingerprint enrollment may be initiated under several conditions. For example, when the sensor apparatus 110 of the electronic apparatus 100 is first time touched by the user's finger, a dialogue window with "Yes" and "No" buttons may be popped up to ask whether the user of the electronic apparatus 100 would willing to enroll the fingerprint as an authentication mechanism. The user may select "Yes" button for initiating the fingerprint enrollment. In another embodiment of the present invention, the user may manually execute the related application installed in the electronic apparatus 100 to initiate the fingerprint enrollment.

Figure 3:
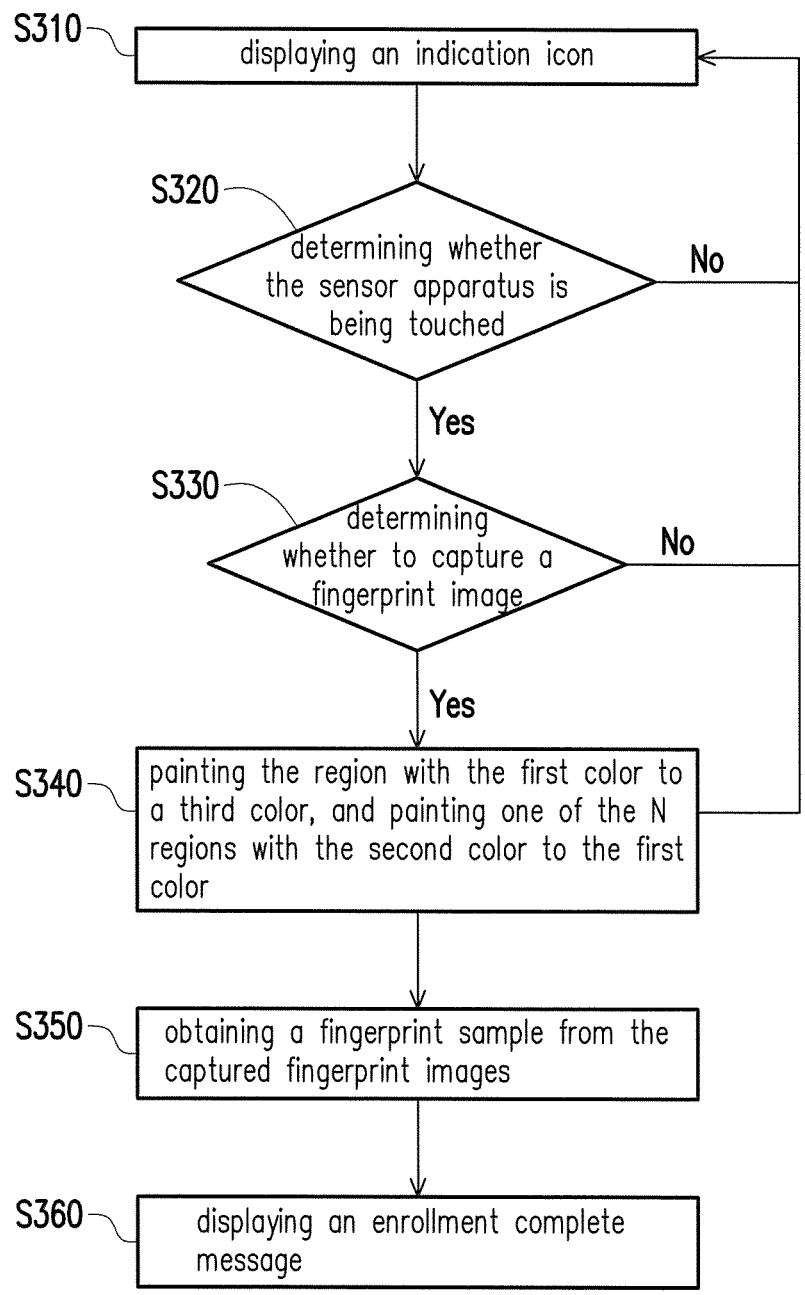
FIG. 3 is a flowchart illustrating a fingerprint enrollment method according to an embodiment of the present invention.

FIG. 3 is a flowchart illustrating a fingerprint enrollment method according to an embodiment of the present invention. Referring to FIG. 1, FIG. 2 and FIG. 3 together, the fingerprint enrollment method includes following steps. An indication icon is displayed by the display unit 120 (step S310), wherein the indication icon is divided into N regions. N is a positive integer larger than 1. For example, in an embodiment of the present invention, the indication icon is divided to a first region, a second region, a third region, . . . and a $N_{th}$ region.

Figure 4:
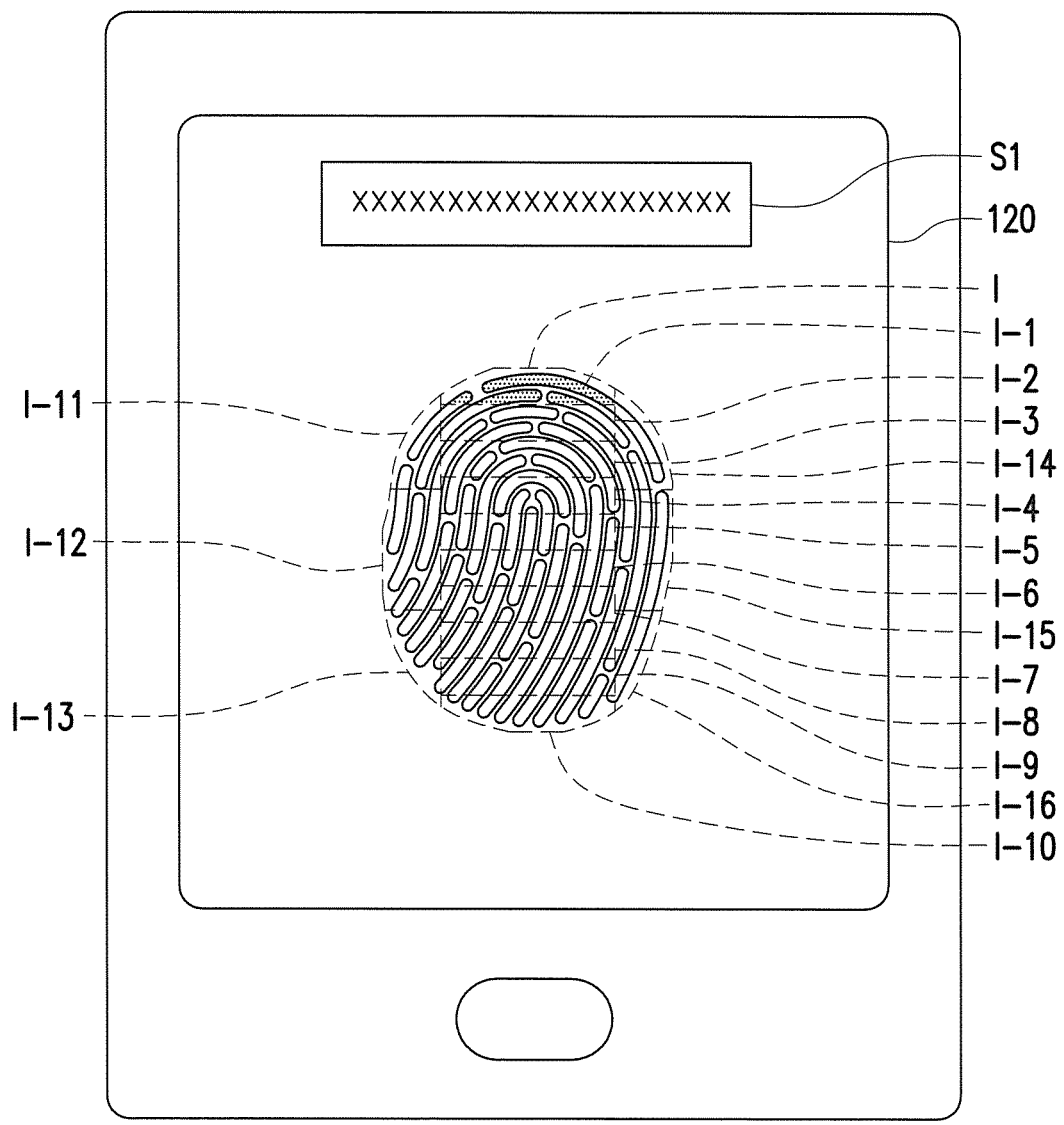
FIG. 4 is a schematic diagram illustrating an indication icon according to an embodiment of the present invention.

FIG. 4 is a schematic diagram illustrating an indication icon according to an embodiment of the present invention. Referring to FIG. 4, in the present embodiment, the indication icon I is a graphical fingerprint icon, and the indication icon I is divided into 16 regions I-1 to I-16. That is to say, in the present embodiment, the N is 16, but it is not limited herein. When the indication icon I is initially displayed by the display unit 120, the region I-1 (the first region mentioned above) is painted with a first color, and other regions I-2 to I-16 (the second region to the $N_{th}$ region mentioned above) are painted with a second color. The first color is, for example, a dark grey, and the second color is, for example, a light grey, but those are not limited herein.

In one embodiment of the present invention, for the divided N regions, the first region to a $M_{th}$ region are located at a central part of the indication icon, and a $(M+1)_{th}$ region to the $N_{th}$ region are located at an outer part of the indication icon, where N is a positive integer larger than 3, and M is a positive integer lower than N but larger than 1. Referring to FIG. 4, in the present embodiment, regions I-1 to I-10 are located at the central part of the indication icon I, and regions I-11 to I-16 are located at the outer part of the indication icon I, such that M is 10.

Moreover, in an embodiment of the present invention, the region painted with the first color on the indication icon I represents the part of the fingerprint that the electronic apparatus 100 is desired to obtain from the user's finger. Referring to FIG. 4, the region I-1 painted with the first color is displayed for suggesting the user to put the top of the finger on the sensor apparatus 110. Moreover, a first content string S1 is displayed with the indication icon I by the display unit 120. The first content string S1, for example, may be "Touch and Lift", such that the user may follow the instruction conveyed by the first content string S1 to touch and lift the finger on the sensor apparatus 110.

Referring to FIG. 3, after the indication icon I is displayed, the processing unit 130 controls the sensor apparatus 110 to determine whether the sensor apparatus 110 is being touched (step S320). When determined that the sensor apparatus 110 is not being touched, then the processing unit 130 controls the display unit 120 to continuously display the indication icon I (step S310). However, when determined that the sensor apparatus 110 is being touched by the user's finger, the processing unit 130 controls the sensor apparatus 110 for further determining whether to capture a fingerprint image (step S330). In an embodiment of the present invention, the sensor apparatus 110 should be touched by the user over a time period, such as 120 milliseconds but not limited thereto, to trigger capturing of the fingerprint image.

Figure 5:
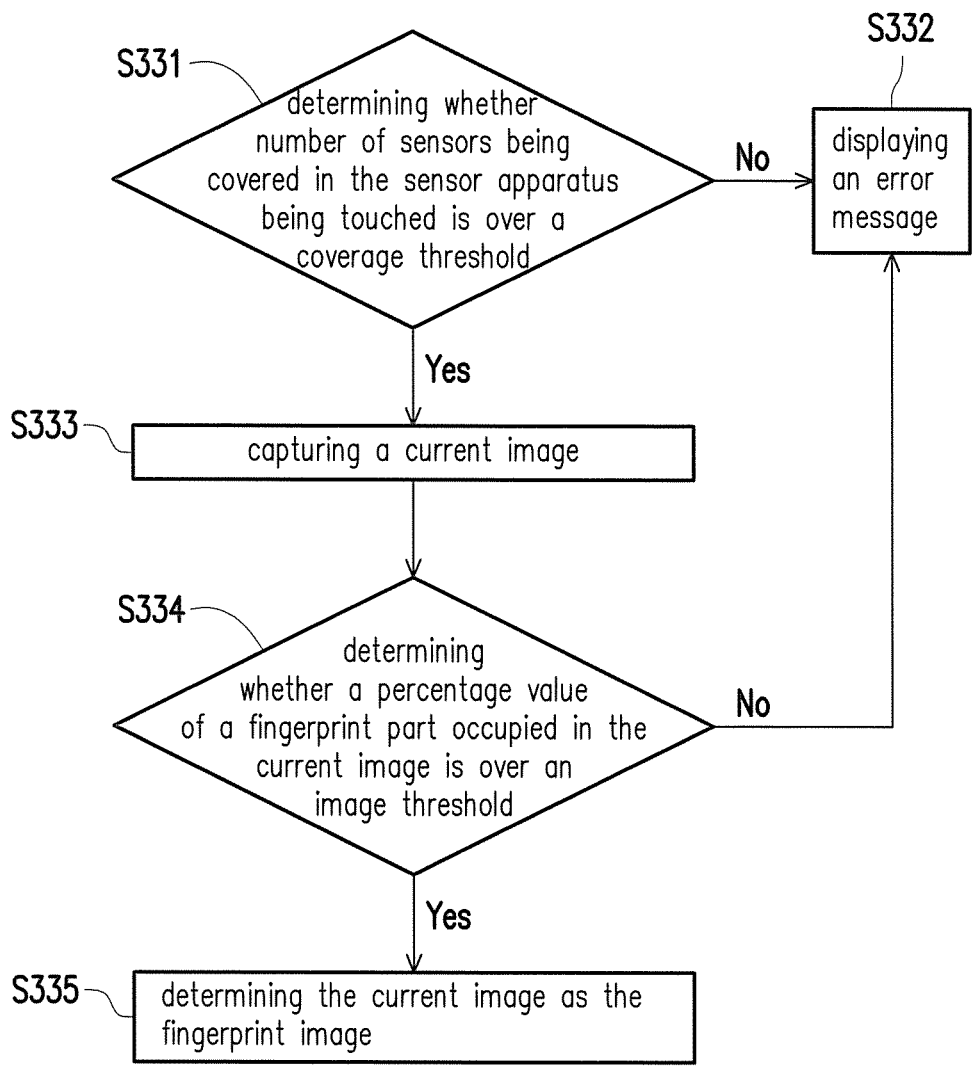
FIG. 5 is a flowchart illustrating a step of determining whether to capture a fingerprint image according to an embodiment of the present invention.

FIG. 5 is a flowchart illustrating a step of determining whether to capture a fingerprint image according to an embodiment of the present invention. Referring to FIG. 5, in the present embodiment, when determined that the sensor apparatus 110 is being touched, the processing unit 130 first determines whether the number of the sensors being covered in the sensor apparatus 110 being touched is over a coverage threshold (step S331). As stated above, the sensor apparatus 110 may contain multiple sensors arranged in the sensor matrix. When the user touches the sensor apparatus 110, the position of the finger may not fully cover all the sensors in the sensor apparatus 110. Further, if the position of the finger is seriously shifted from the sensor apparatus 110, there may be only a few sensors in the sensor apparatus 110 that can correctly sense the fingerprint from the user's finger. Under such condition, even the image is captured, it is insufficient and worthless for constructing the fingerprint sample.

Based on the above, in the present embodiment, the number of the coverage threshold should not be smaller than the half of the total number of the sensors, but it is not limited herein. In other words, the coverage threshold may be adjusted according to the design of the sensor apparatus 110. For example, when the total number of the sensors in the sensor apparatus 110 is 12, then the coverage threshold may be 6, 7 or more. Referring to FIG. 6, if the number of the sensors being covered is not over the coverage threshold, the processing unit 130 controls the display unit 120 to display an error message (step S332). By contrast, if the number of the sensors being covered is over the coverage threshold, the processing unit 130 controls the sensor apparatus 110 to capture a current image (step S333) in response to a determination that the number of the sensors being covered is over the coverage threshold.

After the current image is captured, the processing unit 130 further determines whether a percentage value of a fingerprint part occupied in the current image is over an image threshold (step S334). Specifically, the processing unit 130 further checks whether the current image contains sufficient information for constructing the fingerprint sample. In other words, the fingerprint part in the current image should be large enough and over the image threshold. The image threshold is for example, 50 percent or more, but it is not limited herein.

Referring to FIG. 6, if the percentage value of the fingerprint part occupied in the current image is not over the image threshold, the processing unit 130 controls the display unit 120 to display an error message (step S332). However, if the percentage value of the fingerprint part occupied in the current image is over the image threshold, the processing unit 130 determines the current image as the fingerprint image (step S335) in response to a determination that the percentage value of the fingerprint part occupied in the current image is over the image threshold.

Referring to FIG. 3, in the present embodiment, each time when the fingerprint image is captured, the processing unit 130 paints the region displayed by the display unit 120 with the first color to the third color, and paints one of the N regions displayed by the display unit 120 with the second color to the first color (step S340).

Figure 6A:
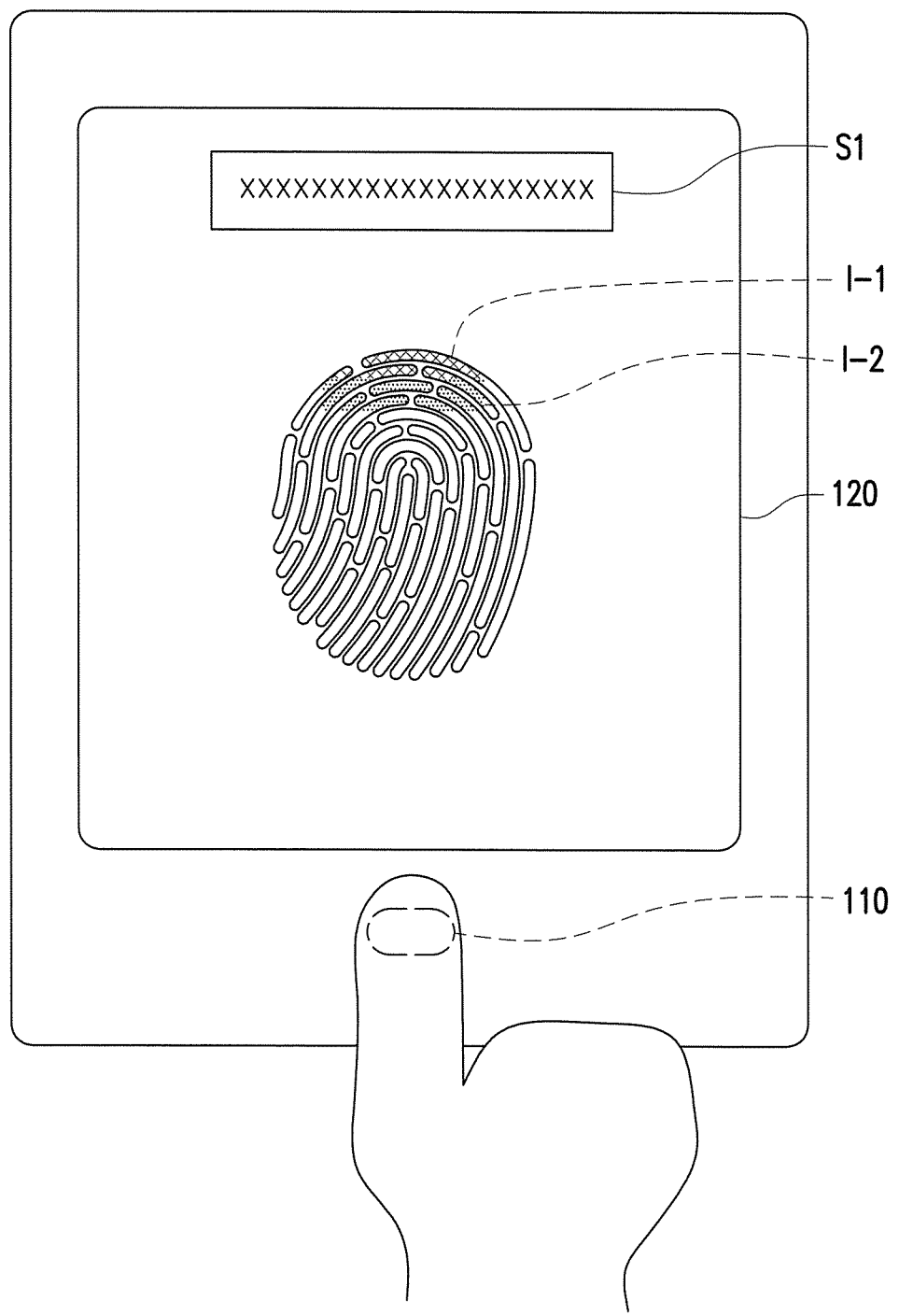
FIG. 6A to FIG. 6E are schematic diagrams illustrating variation of the indication icon along with the execution of the fingerprint enrollment method according to an embodiment of the present invention.

FIG. 6A to FIG. 6E are schematic diagrams illustrating variation of the indication icon along with the execution of the fingerprint enrollment method according to an embodiment of the present invention. Referring to FIG. 4 and FIG. 6A, as the description mentioned above, when the indication icon I is initially displayed, the region I-1 is painted with the first color, and the regions I-2 to I-16 are painted with the second color. However, after the first fingerprint image is captured by the sensor apparatus 110 and the processing unit 130, the processing unit 130 further paints the region I-1 with the first color displayed by the display unit 120 to the third color. In addition, the processing unit 130 follows the painting order to sequentially paint one of the regions I-2 to I-16 with the second color displayed by the display unit 120 to the first color. The third color may be the light blue, for example, but it is not limited in the present embodiment. Moreover, in the present embodiment, the painting order is from the second region I-2 to the sixteenth region I-16 (from the second region to the $N_{th}$ region), but it is not limited herein.

As shown in FIG. 6A, after the first fingerprint image is captured, the region I-1 is painted to the third color, and the region I-2 is painted from the second color to the first color. In the present embodiment, the region with the third color may applied for indicating the progress of the fingerprint enrollment. Each time the fingerprint image is captured, one of the regions with the first color is then painted to the third color. Therefore, as the number of the captured fingerprint image is increased, the number of the regions with the third color is also increased.

Moreover, the fingerprint image captured by the sensor apparatus 110 and the processing unit 130 is stored in the storage unit or stored in a remote databased through the communication unit.

Figure 6B:
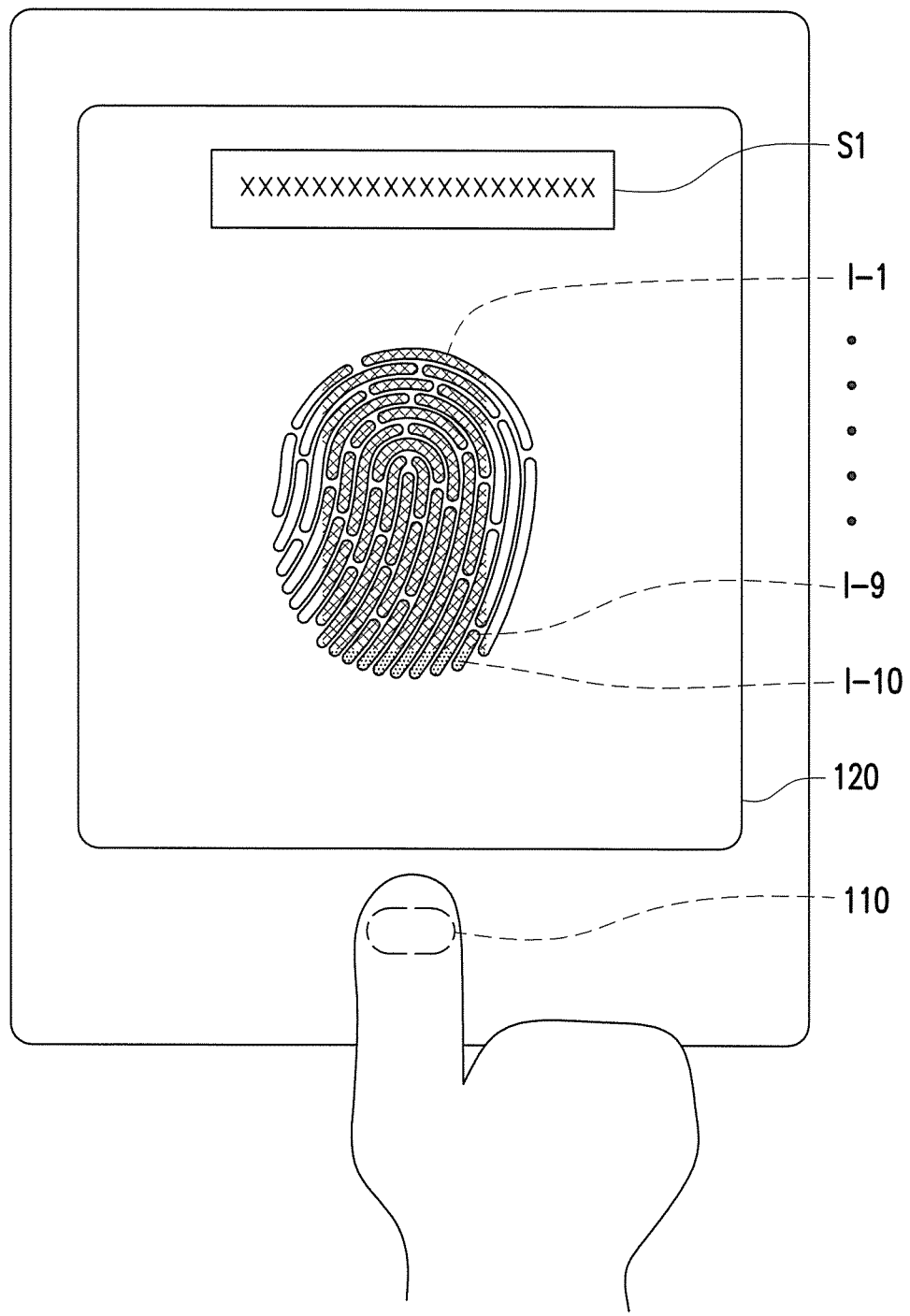

Referring to FIG. 6B, after nine fingerprint images are captured, the regions I-1 to I-9 are displayed with the third color, and the region I-10 is displayed with the first color. The region I-10 is the last region located at the central part of the indication icon I being painted to the first color, and the rest of the regions I-11 to I-16 with the second color are located at the outer part of the indication icon I. Thus, referring to FIG. 6C, after the tenth fingerprint image is captured, the processing unit 130 paints the region I-11 located at the edge of the indication icon I with the second color displayed by the display unit 120 to the first color. In an embodiment of the present invention, such design is applied for suggesting the user to further move the finger so that the edge of the fingerprint could also be captured by the sensor apparatus 110.

Figure 6C:
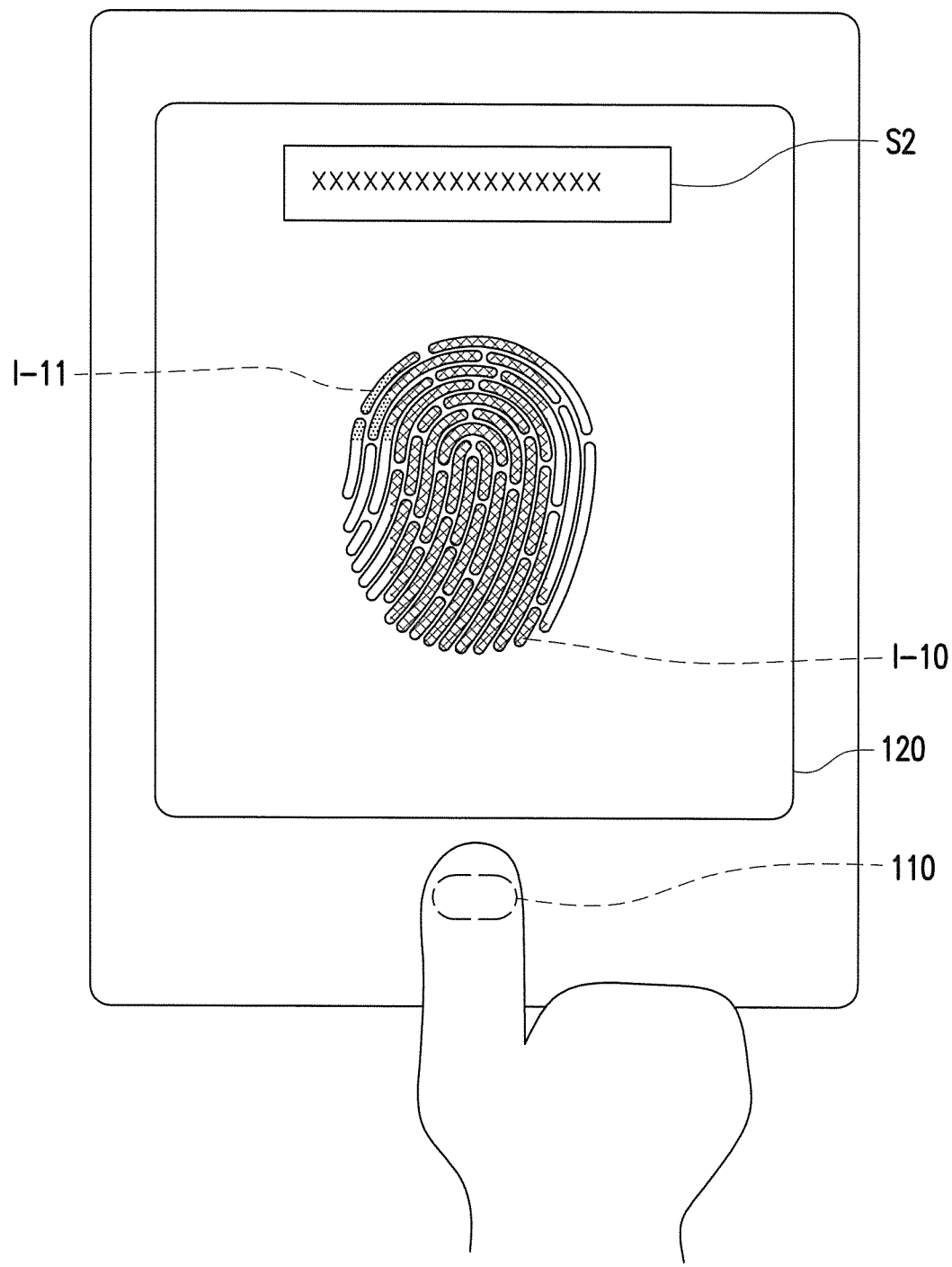

Specifically, when a $L_{th}$ region of the N regions is painted to the first color, the processing unit 130 controls the display unit 120 to display a second content string S2 with the indication icon I instead of the first content sting S1. The second content sting, for example, may be "Scan the Edge", which reminds the user to put the edge of the user's finger on the sensor apparatus 110. In the present embodiment, the $L_{th}$ region is the first region located at the outer part of the indication icon I that painting to the first color. L is a positive integer larger than 1 but lower than (N+1). As shown in FIG. 6C, the $L_{th}$ region is the region I-11, and L is 11.

Figure 6D:
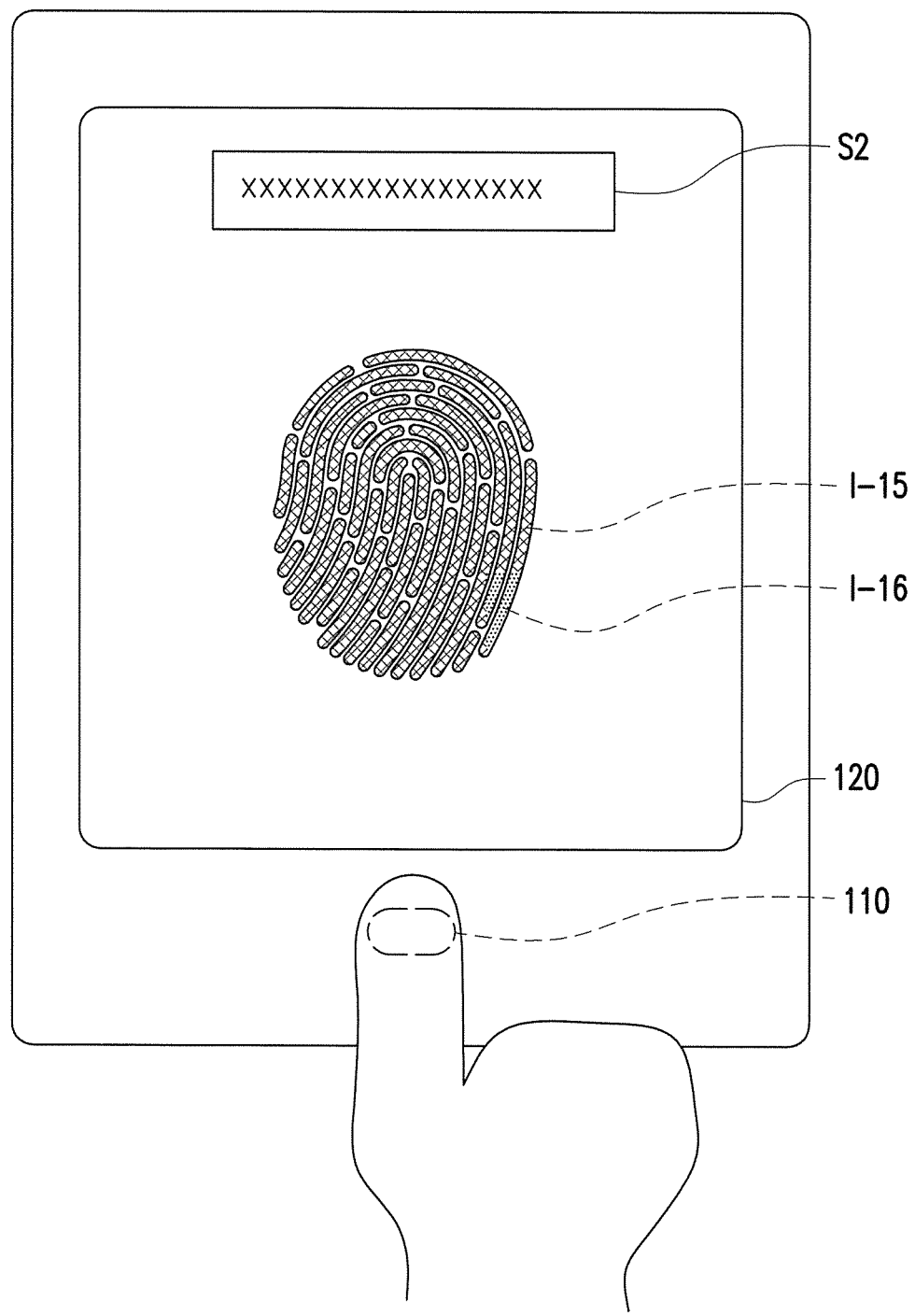

Referring to FIG. 6D, after fifteen fingerprint images are captured, the regions I-1 to I-15 are displayed with the third color, and the region I-16 is displayed with the first color. The region I-16 is the last region that painted to the first color by the processing unit 130.

Figure 6E:
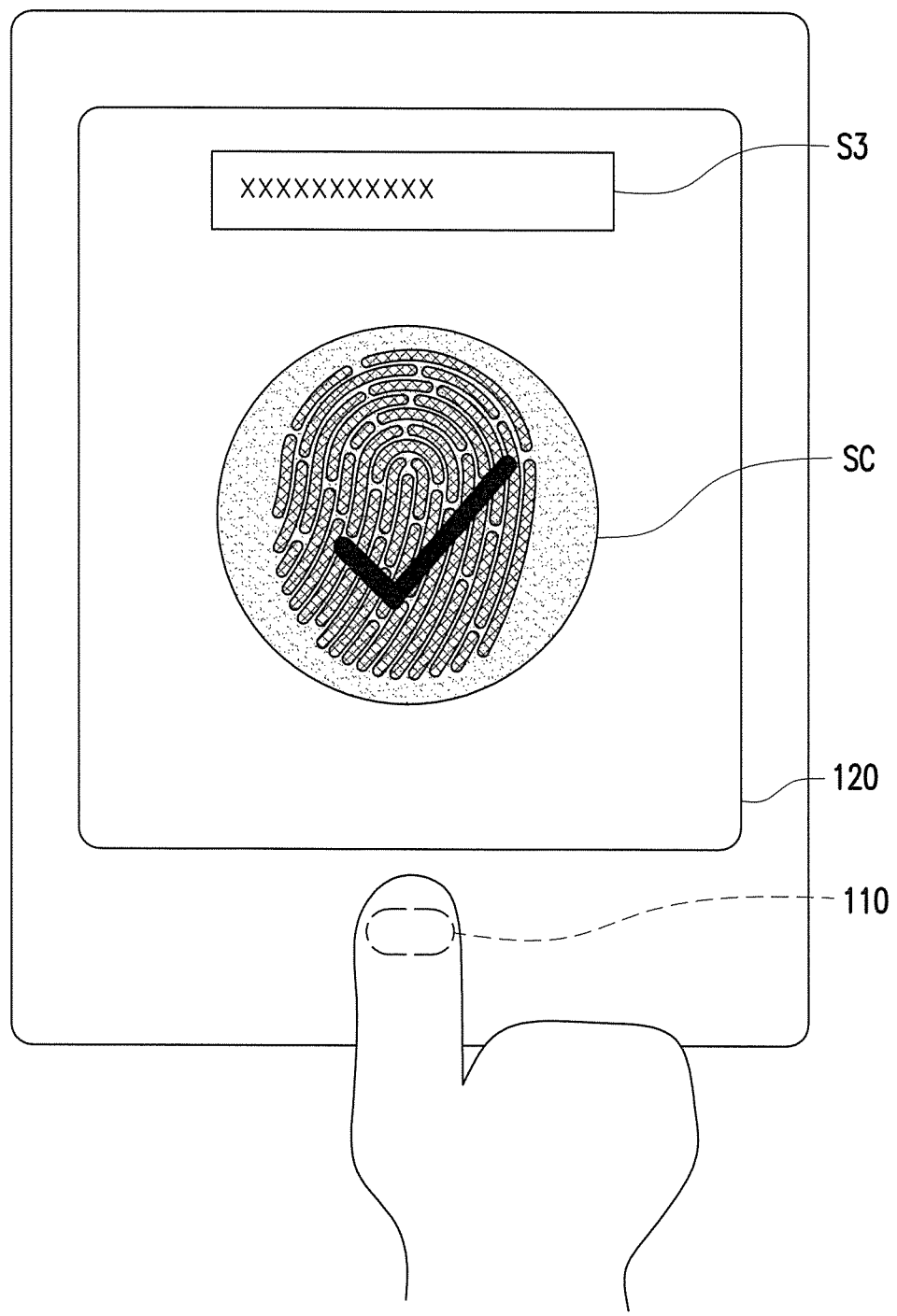

Referring to FIG. 3 and FIG. 6E, after the sixteenth fingerprint image is captured, which means the number of the captured fingerprint images is up to 16 (or up to N, where N is a positive integer larger than 1), the processing unit 130 obtains a fingerprint sample from the captured fingerprint images (step S350), and then controls the display unit 120 to display an enrollment complete message SC (step S360). To be more specific, in an embodiment of the present invention, the processing unit 130 combines the fingerprint images to obtain the fingerprint sample, and adds the fingerprint sample into an authentication model. Also, the fingerprint sample is stored to the storage unit or the remote database through the communication unit. In one embodiment of the present invention, the processing unit 130 may link the fingerprint sample to an execution of an application. Moreover, the processing unit 130 may further display a third content string S3 with the enrollment complete message SC to instead of the second content string S2. The third content string S3, for example, may be "All Done" that indicates the end of the fingerprint enrollment.

Referring to FIG. 6A to FIG. 6E, it should be noted that, any one of the regions I-1 to I-16 may be chosen as the first region that painted with the first color at the beginning of the fingerprint enrollment. For example, the region I-11 located at the outer part of the indication icon I may be the first region that pained with the first color at the beginning of the fingerprint enrollment. Further, the painting order may also be varied but not always being the same.

The fingerprint enrollment could be repeatedly executed for obtaining multiple fingerprint samples. However, once the first fingerprint sample is obtained and added into the authentication model, then fingerprint authentication could be implemented on the electronic device 100. For example, after the fingerprint sample is obtained, while the electronic device 100 is in an idle state and locked, when the sensor apparatus 110 is being touched over a time threshold by the user for unlocking the electronic apparatus 100, the processing unit 130 controls the sensor apparatus 100 to captured an input image and verifies the input image by the fingerprint sample in the authentication model. The time threshold may be, for example, a second or half of the second, but it is not limited herein. After comparison between the input image and the fingerprint sample, when the input image is verified to be valid for unlocking the electronic apparatus 100, the processing unit 130 unlocks the electronic apparatus 100, and further updates the corresponding fingerprint sample according to the input image, so as to achieve the goal of adaptive learning for the stored fingerprint sample.

In addition, when the input image corresponds to the fingerprint sample linked to the execution of a specific application, the processing unit 130 will execute that application after the verification of the input image. For example, the fingerprint may be linked to a music player application. Therefore, when determined that the input image is corresponding to the fingerprint sample, the processing unit 130 may unlock the electronic apparatus 100 and launch the music player application. For another example, the fingerprint may be linked to an image capturing application. Thus, when determined that the input image is corresponding to the fingerprint sample, the processing unit 130 may unlock the electronic apparatus 100 and capture a photo immediately.

In an embodiment of the present application, multiple fingers may be scanned, and the corresponding fingerprint samples are obtained. In the present embodiment, multiple fingerprint samples may be utilized as a combination code for unlocking the electronic apparatus 100, initiating the execution of a specific application on the electronic apparatus 100 or opening encrypted content. Further, in another embodiment, different fingerprint samples may be linked to the executions of different applications. Thus, different fingers could be used by the user to execute different applications on the electronic apparatus 100.

Using the fingerprint sample and the sensor apparatus 110, in an embodiment of the present application, the electronic apparatus 100 may further apply tempo or rhythm of touching the sensor apparatus 110 by the same finger of the user during a period of time, such as the period of fingerprint enrollment, for unlocking the electronic apparatus 100 or triggering the execution of the specific application on the electronic apparatus 100. Specifically, the tempo or the rhythm of touching the sensor apparatus 110 during a period of time is first recorded by the electronic apparatus 100, and the user should perform the same tempo or the same rhythm on the sensor apparatus 110 for each time unlocking the electronic apparatus 100 or triggering the execution of the specific application.

Further, regarding to usage condition of the electronic apparatus, touch on the sensor apparatus 120 may bring different effects or responses. In an embodiment of the present application, when the display unit 120 is off and the electronic apparatus 100 is idle, a short touch on the sensor apparatus 110 may wake up the electronic apparatus 100, and a long touch on the sensor apparatus 110 may wake up the electronic apparatus 100 and unlock the electronic apparatus 100, wherein the unlocking procedure is performed based on the input image which sensed by the sensor apparatus 110 and verified to be valid. In contrast, when the display unit 120 is on and the electronic apparatus 100 is unlocked, short touch on the sensor apparatus 110 may lead the display unit 120 back to a home page, and a long touch on the sensor apparatus 110 may utilized for an authentication in other services (e.g. perform a web browser). It should be noted that, during the fingerprint enrollment proposed in the present application, the long touch of the sensor apparatus 110 will not trigger the home function, such that the indication icon I will still be displayed by the display unit 120.

The invention also provides a non-transitory computer-readable storage medium, which records computer program to be loaded into an electronic apparatus to execute the steps of the aforementioned method. The computer program is composed of a plurality of program instructions (for example, an organization chart, establishing program instruction, a table approving program instruction, a setting program instruction, and a deployment program instruction, etc.), and these program instructions are loaded into the electronic apparatus and executed by the same to accomplish various steps of the method for fingerprint enrollment.

In summary, in the fingerprint enrollment method, the electronic apparatus and the computer-readable storage medium, the indication icon is displayed, and the indication is divided into a plurality of regions. Each time the fingerprint image is captured, the region with the first color is painted to the third color, and one of the regions with the second color is painted to the first color. When number of the captured fingerprint images is up to number of the divided regions, the fingerprint sample is further obtained from the captured fingerprint images. Therefore, the fingerprint enrollment is guided by the indication icon displayed by the display unit, such that the fingerprint sample is correctly and effectively obtained.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A fingerprint enrollment method, adapted to an electronic apparatus having a sensor apparatus, the fingerprint enrollment method comprising:

displaying graphical fingerprint icon, wherein the graphical fingerprint icon is divided into N regions, N is a positive integer larger than 1, a region of the N regions is initially painted with a first color, and other regions of the N regions are initially painted with a second color;

determining whether the sensor apparatus is being touched;

in response to determining that the sensor apparatus is being touched, determining whether number of sensors being covered in the sensor apparatus being touched is over a coverage threshold, and capturing a current image as a fingerprint image in response to a determination that the number of the sensors being covered is over the coverage threshold;

each time in response to determining that the fingerprint image is captured, painting the region with the first color from the first color to a third color, and painting one of the N regions with the second color from the second color to the first color, wherein the first color, second color, and the third color are different, wherein the one of the N regions painted by the first color is used for suggesting a user move a finger on the sensor apparatus for capturing a part of the fingerprint of the finger corresponding to the one of the N regions having the first color; and in response to determining that the number of the captured fingerprint images is up to N, obtaining a fingerprint sample from the captured fingerprint images.

2. The fingerprint enrollment method according to claim 1, wherein the step of capturing the current image as the fingerprint image in response to the determination that the number of the sensors being covered is over the coverage threshold further comprises:
  determining whether a percentage value of a fingerprint part occupied in the current image is over an image threshold; and
  determining the current image as the fingerprint image in response to a determination that the percentage value of the fingerprint part occupied in the current image is over the image threshold.

3. The fingerprint enrollment method according to claim 1, wherein a first region of the N regions in the graphical fingerprint icon is initially painted with the first color, the step of painting the region with the first color from the first color to the third color and painting one of the N regions with the second color from the second color to the first color comprises:
  painting the region with the first color from the first color to the third color; and
  following a painting order to sequentially paint the one of the N regions with the second color from the second color to the first color, wherein the painting order is from a second region of the N regions to a $N_{th}$ region of the N regions.

4. The fingerprint enrollment method according to claim 3, wherein the first region to a $M_{th}$ region of the N regions are located at a central part of the graphical fingerprint icon, and a $(M+1)_{th}$ region to the $N_{th}$ region of the N regions are located at an outer part of the graphical fingerprint icon, N is a positive integer larger than 3, M is a positive integer lower than N but larger than 1.

5. The fingerprint enrollment method according to claim 1, wherein the step of obtaining the fingerprint sample comprises:
  combining the fingerprint images to obtain the fingerprint sample; and
  adding the fingerprint sample into an authentication model.

6. The fingerprint enrollment method according to claim 5, wherein the step of obtaining the fingerprint sample further comprises:
  linking the fingerprint sample to an execution of an application.

7. The fingerprint enrollment method according to claim 1, wherein the step of displaying the graphical fingerprint icon further comprises:
  displaying a first content string with the graphical fingerprint icon,
  wherein the fingerprint enrollment method further comprises:
  in response to determining that a $L_{th}$ region of the N regions is painted to the first color, displaying a second content string instead of the first content string with the graphical fingerprint icon, where L is a positive integer larger than 1 but lower than (N+1).

8. The fingerprint enrollment method according to claim 1, wherein after the fingerprint sample is obtained, in response to determining that the sensor apparatus is being touched over a time threshold for unlocking the electronic apparatus, an input image is captured and verified by the fingerprint sample.

9. The fingerprint enrollment method according to claim 8, wherein in response to determining that the input image is verified to be valid for unlocking the electronic apparatus, the fingerprint sample is further updated according to the input image.

10. An electronic apparatus, comprising:
  a sensor apparatus, including a plurality of sensors arranged in a sensor matrix;
  a display unit, displaying a graphical fingerprint icon, wherein the graphical fingerprint icon is divided into N regions, N is a positive integer larger than 1, a region of the N regions is initially painted with a first color, and other regions of the N regions are initially painted with a second color; and
  a processing unit, coupled to the sensor apparatus and the display unit, controlling the sensor apparatus to determine whether the sensor apparatus is being touched,
  in response to determining that the sensor apparatus is being touched, the processing unit controls the sensor apparatus for determining whether number of sensors being covered in the sensor apparatus being touched is over a coverage threshold, and capturing a current image as a fingerprint image in response to a determination that the number of the sensors being covered is over the coverage threshold
  wherein each time in response to determining that the fingerprint image is captured, the processing unit paints the region displayed by the display unit with the first color from the first color to a third color, and paints one of the N regions displayed by the display unit with the second color from the second color to the first color, wherein the first color, second color, and the third color are different,
  wherein the one of the N regions painted by the first color is used for suggesting a user move a finger on the sensor apparatus for capturing a part of the fingerprint of the finger corresponding to the one of the N regions having the first color,
  in response to determining that the number of the captured fingerprint images is up to N, the processing unit obtains a fingerprint sample from the captured fingerprint images.

11. The electronic apparatus according to claim 10, wherein a first region of the N regions in the graphical fingerprint icon is initially painted with the first color, the processing unit paints the region with the first color from the first color to the third color, and follows a painting order to sequentially paints the one of the N regions with the second color from the second color to the first color, the painting order is from a second region of the N regions to a $N_{th}$ region of the N regions.

12. The electronic apparatus according to claim 11, wherein the first region to a $M_{th}$ region of the N regions are located at a central part of the graphical fingerprint icon, and a $(M+1)_{th}$ region to the $N_{th}$ region of the N regions are located at an outer part of the graphical fingerprint icon, N is a positive integer larger than 3, M is a positive integer lower than N but larger than 1.

13. The electronic apparatus according to claim 10,
  the processing unit determines whether a percentage value of a fingerprint part occupied in the current image is over an image threshold, and the processing unit determines the current image as the fingerprint image in response to a determination that the percentage value of the fingerprint part occupied in the current image is over the image threshold.

14. The electronic apparatus according to claim 10, wherein the processing unit combines the fingerprint images to obtain the fingerprint sample, and adds the fingerprint sample into an authentication model.

15. The electronic apparatus according to claim 10, wherein the processing unit controls the display unit to display a first content string with the graphical fingerprint icon,
in response to detecting, by the processing unit, that a $L_{th}$ region of the N regions is painted to the first color, the processing unit controls the display unit to display a second content string instead of the first content string with the graphical fingerprint icon, where L is a positive integer larger than 1 but lower than (N+1).

16. The electronic apparatus according to claim 10, wherein after the fingerprint sample is obtained, in response to determining that the sensor apparatus is being touched over a time threshold for unlocking the electronic apparatus, the processing unit controls the sensor apparatus to capture an input image and verifies the input image by the fingerprint sample.

17. The electronic apparatus according to claim 16, wherein in response to determining that the input image is verified to be valid for unlocking the electronic apparatus, the processing unit further updates the fingerprint sample according to the input image.

18. A non-transitory computer-readable storage medium, storing programs to be loaded into an electronic apparatus having a sensor apparatus to perform steps of:
displaying a graphical fingerprint icon, wherein the graphical fingerprint icon is divided into N regions, N is a positive integer larger than 1, a region of the N regions is initially painted with a first color, and other regions of the N regions are initially painted with a second color;
determining whether the sensor apparatus is being touched;
in response to determining that the sensor apparatus is being touched, determining whether number of sensors being covered in the sensor apparatus being touched is over a coverage threshold, and capturing a current image as a fingerprint image in response to a determination that the number of the sensors being covered is over the coverage threshold;
each time in response to determining that the fingerprint image is captured, painting the region with the first color from the first color to a third color, and painting one of the N regions with the second color from the second color to the first color, wherein the first color, second color, and the third color are different,
wherein the one of the N regions painted by the first color is used for suggesting a user move a finger on the sensor apparatus for capturing a part of the fingerprint of the finger corresponding to the one of the N regions having the first color; and
in response to determining that the number of the captured fingerprint images is up to N, obtaining a fingerprint sample from the captured fingerprint images.

* * * * *